US005541836A

United States Patent [19]

Church et al.

[11] Patent Number: 5,541,836

[45] Date of Patent: Jul. 30, 1996

[54] WORD DISAMBIGUATION APPARATUS AND METHODS

[75] Inventors: Kenneth W. Church, Chatham; William A. Gale, Maplewood; David E. Yarowsky, Summit, all of N.J.

[73] Assignee: AT&T Corp., Murray Hill, N.J.

[21] Appl. No.: 814,850

[22] Filed: Dec. 30, 1991

[51] Int. Cl.$^6$ ............................................. G06F 19/00
[52] U.S. Cl. ............................................. 364/419.07
[58] Field of Search ........................... 364/419, 419.07, 364/419.08, 419.12, 419.13

[56] References Cited

U.S. PATENT DOCUMENTS

| | | | |
|---|---|---|---|
| 4,661,924 | 4/1987 | Okamoto et al. | 364/DIG. 2 |
| 4,868,750 | 9/1989 | Kucera et al. | 364/419 |
| 4,914,590 | 4/1990 | Loatman et al. | 364/419 |
| 4,930,077 | 5/1990 | Fan | 364/419 |
| 4,942,526 | 7/1990 | Okojima et al. | 364/419 |
| 5,056,021 | 10/1991 | Ausborn | 364/419 |
| 5,088,038 | 2/1992 | Tanaka et al. | 364/419.08 |
| 5,109,509 | 4/1992 | Katayama et al. | 395/600 |
| 5,128,865 | 7/1992 | Sadler | 364/419 |
| 5,146,405 | 9/1992 | Church | 364/419 |
| 5,170,349 | 12/1992 | Yagisawa et al. | 364/419 |
| 5,237,503 | 8/1993 | Bedecarrax et al. | 364/419.08 |
| 5,243,520 | 9/1993 | Jacobs et al. | 364/419.08 |
| 5,317,510 | 3/1994 | Yoshimura et al. | 364/419.08 |

OTHER PUBLICATIONS

IBM Technical Disclosure Bulletin vol. 33 No. 1B Jun. 1990 Armonk US pp. 54–55 "Method for Inferring Lexical Associations from Textual Co–Occurrences".

E. Black, "An Experiment in Computational Discrimination of English Word Senses", *IBM Journal of Research and Development*, vol. 32, No. 2, Mar. 1988, Armonk, NY, USA.

"Word Sense Disambiguation Using an Untagged Corpus", *IBM Technical Disclosure Bulletin*, vol. 35, No. 6, Nov. 1992.

J. D. Benson and B. Brainerd, "Chesterton's Parodies of Swinburne and Yeats: A Lexical Approach", *Literary and Linguistic Computing*, vol. 3, No. 4, 1988.

R. Krovetz, W. Bruce Croft, "Word Sense Disambiguation Using Machine–Readable Dictionaries", Proceedings of the 12th Annual International ACMSIGIR Conference on Research and Development in Information Retrieval, Jun. 1989, Cambridge.

*Primary Examiner*—Donald E. McElheny, Jr.
*Attorney, Agent, or Firm*—Gordon E. Nelson; Jeffrey M. Weinick

[57] ABSTRACT

Apparatus and methods for determining whether a word/ sense pair is proper for a context. Wide contexts (100 words) are employed for both training and testing, and testing is done by adding the weights of vocabulary words from the context. The weights are determined by Bayesian techniques which interpolate between the probability of occurrence of a vocabulary word in a conditional sample of the training text and the probability of its occurrence in the entire training text. A further improvement in testing takes advantage of the fact that a word is generally used in only a single sense in a single discourse. Also disclosed are automated training techniques including training on bilingual bodies of text and training using categories from Roget's Thesaurus.

37 Claims, 2 Drawing Sheets

| Table 6: Selected Portions of Two Models | | | | | | | |
|---|---|---|---|---|---|---|---|
| tax sense of *duty* | | | | obligation sense of *duty* | | | |
| weight*freq | weight | freq | word | weight*freq | weight | freq | word |
| 285 | 5.7 | 50 | countervailing | 64 | 3.2 | 20 | petitions |
| 111.8 | 4.3 | 26 | duties | 59.28 | 0.26 | 228 | to |
| 99.9 | 2.7 | 37 | u.s | 56.28 | 0.42 | 134 | I |
| 73.1 | 1.7 | 43 | trade | 51 | 3 | 17 | petition |
| 70.2 | 1.8 | 39 | states | 47.6 | 2.8 | 17 | pursuant |
| 69.3 | 3.3 | 21 | duty | 46.28 | 0.52 | 89 | mr |
| 68.4 | 3.6 | 19 | softwood | 37.8 | 2.7 | 14 | honour |
| 68.4 | 1.9 | 36 | united | 37.8 | 1.4 | 27 | order |
| 58.8 | 8.4 | 7 | rescinds | 36 | 2 | 18 | present |
| 54 | 3 | 18 | lumber | 33.6 | 2.8 | 12 | proceedings |
| 50.4 | 4.2 | 12 | shingles | 31.5 | 3.5 | 9 | prescription |
| 50.4 | 4.2 | 12 | shakes | 31.32 | 0.87 | 36 | house |
| 46.8 | 3.6 | 13 | 35 | 29.7 | 3.3 | 9 | reject |
| 46.2 | 2.1 | 22 | against | 29.4 | 4.2 | 7 | boundaries |
| 41.8 | 1.1 | 38 | canadian | 28.7 | 4.1 | 7 | electoral |

OOD CARVING .SB The gutter *adz* has a concave blade for forming le equipment such as a hydraulic *shovel* capable of lifting 26 cubic me ommon .SB Resembling a power *shovel* mounted on a floating hull , th ic equipment , valves for nuclear *generators* , oil-refinery *turbines* , and to 8000 BC , flint-edged wooden *sickles* were used to gather wild grain steel-penetrating carbide-tipped *drills* forced manufacturers to find str itement heightens the colors .SB *Drills* live in the forests of equatorial — 303
the traditional ABC method and *drill* were unchanged , and dissatisfac s center of rotation .PP A tower *crane* is an assembly of fabricated ste n marshy areas .SB The crowned *crane* , however , occasionally nests i — 305

403 { TOOLS/MACHINERY (Category 348): saw (5.1), lever (4.1), blade (3.8), knife (3.8), pump (3.5), gear (3.5), piston(3.6), shaft(3.3), tool (3.1), wheel (2.8), machine (2.7), engine (2.6), cut (2.6), tooth (2.5), device (2.2), wood (2.0),....

405 { ANIMAL,INSECT (Category 414): tail (2.7), bird (2.6), wild (2.6), coat (2.5), nest (2.5), fish (2.4), species (2.3), egg (2.2), inhabit (2.2), breed (2.2), cm (2.2), eat (2.2), female (2.0), animal (1.7), family (1.7), common (1.3),....

WORD DISAMBIGUATION APPARATUS AND METHODS

BACKGROUND OF THE INVENTION

1. Field of the Invention

The invention relates to computerized text analysis generally and more specifically to the problem of determining whether a given word-sense pair is proper for a given context.

2. Description of the Prior Art

Machine translation of natural language texts has long been a goal of researchers in computer science and linguistics. A major barrier to high-quality machine translation has been the difficulty of disambiguating words. Word disambiguation is necessary because many words in any natural language have more than one sense. For example, the English noun sentence has two senses in common usage: one relating to grammar, where a sentence is a part of a text or speech, and one relating to punishment, where a sentence is a punishment imposed for a crime. Human beings use the context in which the word appears and their general knowledge of the world to determine which sense is meant, and consequently do not even have trouble with texts such as:

The teacher gave the student the sentence of writing the sentence "I will not throw spit wads" 100 times.

Computers, however, have no general knowledge of the world, and consequently, have had a great deal of trouble translating sentences such as the above into languages such as French, where the word used to translate sentence when it is employed in the grammatical sense is phrase and the word used to translate sentence when it is employed in the sense of punishment is peine.

The ability to determine a probable sense of a word from the context in which the word is used important in other areas of text analysis as well. For example, optical character recognition systems and speech recognition systems often can only resolve a printed or spoken word into a small set of possibilities; one way of making a choice among the words in the small set is to determine which word has a sense which best fits the context. Other examples in this area are determining whether characters such as accents or umlauts should be present on a word or whether the word should be capitalized. Additionally, there are text editing tools such as spelling checkers or interactive thesauri which present the user with a set of suggested alternatives for a word. These tools, too, are improved if the set of alternatives is limited to words whose senses fit the context.

Another area of text analysis that will benefit from good techniques for determining the probable sense of a word from its context is data base searching. Word searches in data bases work by simply matching a search term with an occurrence of the term in the data base, without regard to the sense in which the term is used in the data base. The only way to restrict a search to a given sense of a term is to provide other search terms which the searcher expects to find in conjunction with the first search term. Such a search strategy will, however, miss occurrences of the first term where the first term has the proper sense but is not found in conjunction with the other search terms. Given a useful way of determining what sense of a word best fits a context, it will be possible to search by specifying not only the search term, but also the sense in which it is being used.

Past researchers have used three different general approaches to the word disambiguation problem sketched above:

1. Qualitative Methods, e.g., Hirst (1987)
2. Dictionary-based Methods, e.g., Lesk (1986)
3. Corpus-based Methods, e.g., Kelly and Stone (1975)

In each case, the work has been limited by a knowledge acquisition bottleneck. For example, there has been a tradition in parts of the AI community of building large experts by hand, e.g., Granger (1977), Rieger (1977), Small and Rieger (1982), Hirst (1987). Unfortunately, this approach is not very easy to scale up, as many researchers have observed:

"The expert for THROW is currently six pages long, . . . but it should be 10 times that size." (Small and Reiger, 198X)

Since this approach is so difficult to scale up, much of the work has had to focus on "toy" domains (e.g., Winograd's Blocks World) or sublanguages (e.g., Isabelle (1984), Hirschman (1986)). Currently, it is not possible to find a semantic network with the kind of broad coverage that would be required for unrestricted text.

Others such as Lesk (1986), Walker (1987), Ide (1990, Waterloo Meeting) have turned to machine-readable dictionarys (MRD) such as Oxford's Advanced Learner's Dictionary of Current English (OALDCE) in the hope that MRDs might provide a way out of the knowledge acquisition bottleneck. These researchers seek to develop a program that could read an arbitrary text and tag each word in the text with a pointer to a particular sense number in a particular dictionary. Thus, for example, if Lesk's program was given the phrase pine cone, it ought to tag pine with a pointer to the first sense under pine in OALDCE (a kind of evergreen tree), and it ought to tag cone with a pointer to the third sense under cone in OALDCE (fruit of certain evergreen trees). Lesk's program accomplishes this task by looking for overlaps between the words in the definition and words in the text "near" the ambiguous word.

Unfortunately, the approach doesn't seem to work as well as one might hope. Lesk (1986) reports accuracies of 50–70% on short samples of *Pride and Prejudice*. Part of the problem may be that dictionary definitions are too short to mention all of the collocations (words that are often found in the context of a particular sense of a polysemous word). In addition, dictionaries have much less coverage than one might have expected. Walker (1987) reports that perhaps half of the words occurring in a new text cannot be related to a dictionary entry.

Thus, like the AI approach, the dictionary-based approach is also limited by the knowledge acquisition bottleneck; dictionaries simply don't record enough of the relevant information, and much of the information that is stored in the dictionary is not in a format that computers can easily digest, at least at present.

A third line of research makes use of hand-annotated corpora. Most of these studies are limited by the availability of hand-annotated text. Since it is unlikely that such text will be available in large quantities for most of the polysemous words in the vocabulary, there are serious questions about how such an approach could be scaled up to handle unrestricted text. Kelly and Stone (1975) built 1815 disambiguation models by hand, selecting words with a frequency of at least 20 in a half million word corpus. They started from key word in context (KWIC) concordances for each word, and used these to establish the senses they perceived as useful for content analysis. The models consisted of an ordered set of rules, each giving a sufficient condition for deciding on one classification, or for jumping to another rule in the same model, or for jumping to a rule in the model for another word. The conditions of a given rule could refer to the context within four words of the target word. They could test the morphology of the target word, an exact context word, or the part of speech or semantic class of any of the context words. The sixteen semantic classes were assigned by hand.

Most subsequent work has sought automatic methods because it is quite labor intensive to construct these rules by hand. Weiss (1973) first built rule sets by hand for five words, then developed automatic procedures for building similar rule sets, which he applied to an additional three words. Unfortunately, the system was tested on the training set, so it is difficult to know how well it actually worked.

Black (1987, 1988) studied five 4-way polysemous words using about 2000 hand tagged concordance lines for each word. Using 1500 training examples for each word, his program constructed decision trees based on the presence or absence of 81 "contextual categories" within the context of the ambiguous word. He used three different types of contextual categories: (1) subject categories from LDOCE, the Longman Dictionary of Contemporary English (Longman, 1978), (2) the 41 vocabulary items occurring most frequently within two words of the ambiguous word, and (3) the 40 vocabulary items excluding function words occurring most frequently in the concordance line. Black found that the dictionary categories produced the weakest performance (47 percent correct), while the other two were quite close at 72 and 75 percent correct, respectively.

There has recently been a flurry of interest in approaches based on hand-annotated corpora. Hearst (1991) is a very recent example of an approach somewhat like Black (1987, 1988), Weiss (1973) and Kelly and Stone (1975), in this respect, though she makes use of considerably more syntactic information than the others did. Her performance also seems to be somewhat better than the others', though it is difficult to compare performance across systems.

As may be seen from the foregoing, the lack of suitable techniques for determining which word-sense pair best fits a given context has been a serious hindrance in many areas of text analysis. It is an object of the apparatus and methods disclosed herein to provide such techniques.

SUMMARY OF THE INVENTION

In one aspect, the invention is a method of automatically determining that a word/sense pair has a sense which suits a given position in a text. The method includes the steps of:
  determining a sequence of words in the text which includes the given position and is substantially longer than a single line of the text; and
  determining whether the word/sense pair has the suitable sense by automatically analyzing the sequence.

In another aspect, the invention is a method of automatically determining a probability that a word/sense pair has a sense which suits a given position in a text. The method includes the steps of:
  determining a sequence of words in the text which includes the given position; and
  automatically employing a Bayesian discrimination technique involving the words in the sequence and the sense of the word-sense pair to determine the probability that the word/sense pair has a sense which suits the given position.

In still another aspect, the invention is a method of automatically determining whether a given occurrence of a word in a text has a given sense. The method includes the steps of:

making a first determination of the sense of the given occurrence of the word; and
  making a final determination of the sense of the given occurrence of the word by comparing the first determination with a determination of the sense of a neighboring occurrence of the word.

The foregoing and other objects, aspects, and advantages of the invention will be apparent to one of ordinary skill in the art who peruses the following Drawing and Detailed Description, wherein:

The reference numbers employed in the Drawing and the Detailed Description have three or more digits. The two least significant digits are a number within a figure; the remaining digits are the figure number. Thus, the element with the reference number "305" is first shown in FIG. 3.

DETAILED DESCRIPTION

The following Detailed Description will first provide an overview of the theoretical approach to the disambiguation problem in a preferred embodiment, will then describe apparatus for solving the disambiguation problem, and will finally discuss how the apparatus for solving the disambiguation problem is trained.

BAYESIAN DISAMBIGUATION TECHNIQUES

The word-sense disambiguation problem is a discrimination problem, not very different from problems such as author identification and information retrieval. In author identification and information retrieval, it is customary to split the problem up into a testing phase and a training phase. During the training phase, we are given two (or more) sets of documents and are asked to construct a discriminator which can distinguish between the two (or more) classes of documents. These discriminators are then applied to new documents during the testing phase. In the author identification task, for example, the training set consists of several documents written by each of the two (or more) authors. The resulting discriminator is then tested on documents whose authorship is disputed. In the information retrieval application, the training set consists of a set of one or more relevant documents and a set of zero or more irrelevant documents. The resulting discriminator is then applied to all documents in the library in order to separate the more relevant ones from the less relevant ones. In the sense disambiguation case, the 100-word context surrounding instances of a polysemous word (e.g., duty) are treated very much like a document.

It is natural to take a Bayesian approach to these discrimination problems. Mosteller and Wallace (1964, section 3.1) used the following formula to combine new evidence (e.g., the term by document matrix) with prior evidence (e.g., the historical record) in their classic authors hip study of the Federalist Papers.

$$\frac{P(\text{class 1})}{P(\text{class 2})} = \frac{p(\text{class 1})}{p(\text{class 2})} \times \frac{L(\text{class 1})}{L(\text{class 2})}$$

where P represents a final probability, p represents an initial probability, and L represents a likelihood. Similar equations can be found in textbooks on information retrieval (e.g., Salton (1989), equation 10.17).

The initial odds depend on the problem. In the author identification problem, for example, the initial odds are used to model what we know about the documents from the various conflicting historical records. In the information retrieval application, the user may have a guess about the fraction of the library that he or she would expect to be relevant; such a guess could be used as the prior. It is often the case that the prior probability will not have very much influence on the outcome, which is fortunate, since the prior can sometimes be difficult to estimate.

It is common practice to decompose the likelihoods into a product of likelihoods over tokens (occurrences of words) in the document (under appropriate independence assumptions):

$$\frac{L(\text{class 1})}{L(\text{class 2})} \approx \prod_{tok \text{ in doc}} \frac{Pr(tok \text{ class 1})}{Pr(tok \text{ class 2})}$$

The crucial ingredients for this calculation are the probabilities of each term in the vocabulary conditional on the document being from a given class. These conditional probabilities have been computed in a number of different ways depending on the application and the study.

For two senses, the Bayesian equation mentioned above becomes:

$$\frac{P(\text{sense 1})}{P(\text{sense 2})} = \frac{p(\text{sense 1})}{p(\text{sense 2})} \times \frac{L(\text{sense 1})}{L(\text{sense 2})}$$

where p, P and L are the initial probability, the final probability and likelihood, as before. The initial probabilities are determined from the overall probabilities of the two senses in the corpus. As in other large dimension discrimination problems, the likelihoods are decomposed into a product over tokens:

$$\frac{L(\text{sense 1})}{L(\text{sense 2})} \approx \prod_{tok \text{ in context}} \frac{Pr(tok \text{ class 1})}{Pr(tok \text{ class 2})}$$

Figure 1:
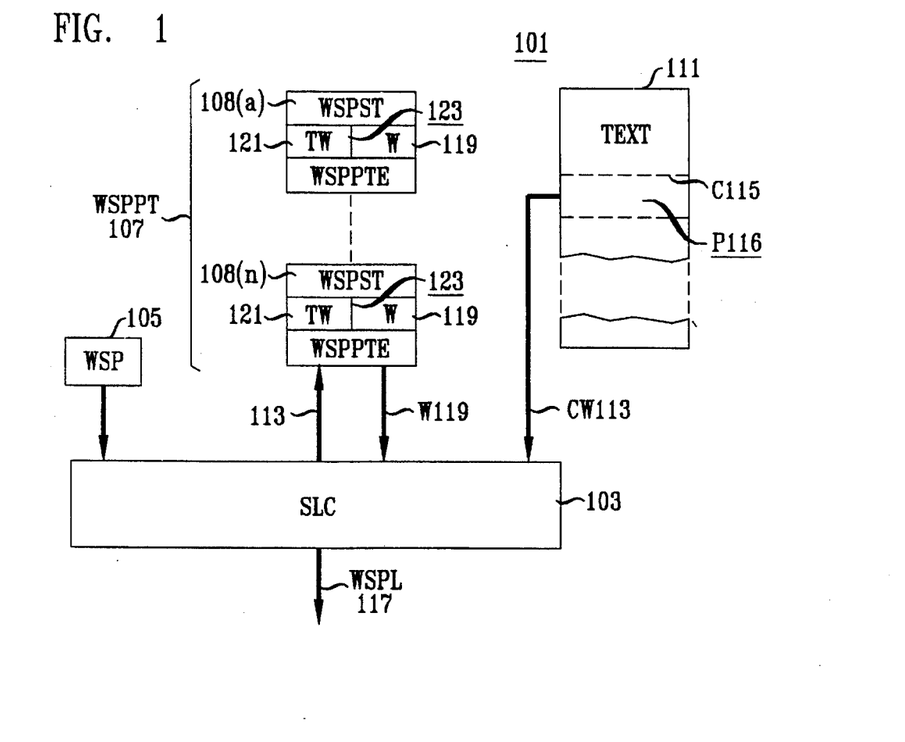
FIG. 1 is a block diagram of apparatus for determining the probability that a word/sense pair is proper for a context.

Apparatus for Use in Word-sense Disambiguation: FIG. 1

FIG. 1 shows apparatus 101 which determines the likelihood that a word/sense pair has the sense required by a given context. In a preferred embodiment, the output of apparatus 101 is the logarithm of the likelihood. Log word/sense pair likelihood (WSPL) 117 is computed by sense likelihood calculator 103. Inputs to sense likelihood calculator 103 come from text 111, word/sense pair probability table 107, and word/sense pair 105. Word/sense pair probability table 107 is a table which contains a subtable 108 for each word/sense pair which is of interest. Each subtable 108 contains entries (WSPPTE) 123 for at least all of the words in text 111 which give useful indications whether the word/sense pair 105 to which subtable 108 corresponds has a sense suitable for position 116. Each entry for a text word 121 contains an indication of the weight 119 of that word for determining whether word/sense pair 105 has a suitable sense.

When sense likelihood calculator 103 is calculating the likelihood that a given word/sense pair 105 is suitable for a position P 116 in text 111, sense likelihood calculator 103 begins reading words of text 111 from 50 words ahead of position 116 and continues reading 50 words following position 116. The 100 words which contain position 116 are position 116's context 115. An important aspect of the preferred embodiment is that there are substantially more words in context 115 than there are in a line of text 111, which is presumed to contain about 10 words. For each current word (CW) 113 read from context 115, calculator 103 determines whether the word has an entry 123 in table 107, and if it does, it adds the weight specified in the entry to the weights accumulated from the words read so far. The value of the accumulated weights 119 is then the likelihood 117 that word/sense pair 105 is suitable for position 116.

Of course, in most applications of apparatus 101, the issue will be which of two or more word/sense pairs best suits context 115. To find that out, one simply uses apparatus 101 as described above for each word/sense pair in turn. The one with the highest accumulated weights is the word/sense pair best suited to position 116. For example, if apparatus 101 were being used in the word disambiguation application, there would be a separate word/sense pair for each sense of the word to be disambiguated, and the sense used to translate the word would be the sense of the word/sense pair with the highest accumulated weights.

When words are being disambiguated, it will occasionally occur that the difference between the highest and the next highest accumulated weights is not enough to permit clear disambiguation. In that case, SLC 103 may take other approaches. One such approach is by analyzing the discourse to which text 111 belongs. For purposes of the present discussion, a discourse is one or more texts which concern a single subject or a set of related subjects. Within a given discourse, ambiguous words tend to be used in a single sense. For instance, if the discourse concerns grammar, sentence used in the punishment sense will rarely occur; if the discourse concerns criminal trial practice, sentence used in the grammatical sense will rarely occur.

A simple way of analyzing a discourse using apparatus 101 is as follows: The text belonging to the discourse is marked as such and calculator 103 stores the most suitable sense and weight for every position where there was clear disambiguation for the word in question. Generally, there will be a heavy preponderance of one of the possible senses, and the preponderant sense can be used in those situations where the analysis of context 115 alone did not clearly disambiguate. An even simpler, albeit less precise way, takes advantage of the fact that adjacent uses of a word tend to belong to the same discourse. In this technique, if the analysis of context 115 alone does not clearly disambiguate, apparatus 101 will apply the result of the examination of a neighboring context 115 which contains the word in question and determine the sense of the word in question from its sense in the neighboring context.

In a preferred embodiment, apparatus 101 is implemented in a digital computer system. Text 111, table 107, and word/sense pair 105 are stored in the computer system's data storage system and sense likelihood calculator 103 is implemented by means of a program executed by the digital computer system's processor. In some embodiments, table 107 may be in read-only memory and sense likelihood calculator may be a special-purpose processor which has been adapted for rapid referencing of table 107. Such an embodiment might, for example, be useful in a pocket translating device or in an electronic typewriter.

Computation of Word/Sense Pair Probability Table 107

Conceptually, word/sense pair probability table 107 is a whole set of subtables 108. There is a subtable 108 for at least every word/sense pair which is of interest for the task we are interested in, and the subtable 108 for that word/sense pair contains an entry for at least every word in text 111. Moreover, what is really wanted is a word/sense pair probability table 107 which will work with virtually any text written in a given language. In the disambiguation context, such a table would conceptually include a subtable 108 for each word/sense pair for each ambiguous word in the given language and each subtable 108 would include entries for every word in the given language. Of course, optimizations are possible. For example, most words will contribute little or nothing to the disambiguation, and such words may simply be left out of the table and given a default weight.

It is apparent that large word/sense pair probability tables 107 can only be computed by machine. In the terms employed in the art, the training of apparatus 101 must be automated. Training is in many respects the reverse of the testing just described. In the disambiguation context, a subtable 108 is created in table 107 for a given ambiguous word by examining contexts 115 which contain known senses of the ambiguous word to find other words in the context which can be used in testing to estimate the probable sense of the ambiguous word. For example, if the subtable 108 is for sentence's punishment sense, the contexts will certainly show more occurrences of the word "judge" or the word "trial" than is normal in English language texts, and these words can be weighted accordingly in table 107.

The largest problem in automating training is of course determining which sense of the word being trained for has in a given context 115. For large tables 107, it is clearly impractical for human readers to flag the word being trained for as having one sense or another in the contexts 115 being used for training. During development of apparatus 101, two techniques have been discovered for automatically determining the sense of the word being trained for in a given context 115. One of the techniques employs bilingual bodies of text; the other employs subject matter categories such as those provided by a thesaurus.

Training on Bilingual Bodies of Text

Training on bilingual bodies of text takes advantage of two facts: first, a translation of a word which is ambiguous in a first language into a word in a second language often indicates the sense of the ambiguous word. Thus, if the English word sentence is translated peine, we know that the English word is being used in the punishment sense. If it is translated phrase, we know that the grammatical sense is meant. Second, there are presently available large amounts of machine-readable text for which versions in two languages are available. One example of such a bilingual body of text is the Canadian Hansards, which is the journal in both English and French of the debates in the Canadian Houses of Parliament. In the following, the English version is termed the English Hansards and the French version the French Hansards.

The preferred embodiment is trained on the Canadian Hansards for one sense of a given ambiguous English word as follows: first, statistics are gathered for the entire body of the English Hansards. The statistics include the number of tokens (words and phrases treated as words) in the English Canadian Hansards and then the number of occurrences of each word in the English Hansards. From these statistics the probability that a given word will occur in a 100-word context of the English Hansards is computed.

Then a conditional sample of the English Hansards is made for the desired sense of the given ambiguous word. This is done by finding each occurrence of the given ambiguous word in the English Hansards. Then the French word (or phrase) which corresponds to the occurrence is located in the French Canadian Hansards. The French word which corresponds to the occurence of the ambiguous English word is located by aligning sentences of the English text with corresponding ones of the French text, as described in Gale, W., and K. Church, "A Program for Aligning Sentences in Bilingual Corpora," *Proceedings: 29th Annual Meeting of the Association for Computational Linguistics*, pp. 177–184, 1991. When located, the French word or phrase determines whether that occurrence of the given word has the desired sense. If it does, the 50 words on either side of the occurrence are output to the conditional sample. It should be pointed out here that the use of a 100-word context in training is as important as it is in the operation of apparatus 101.

Figure 2:
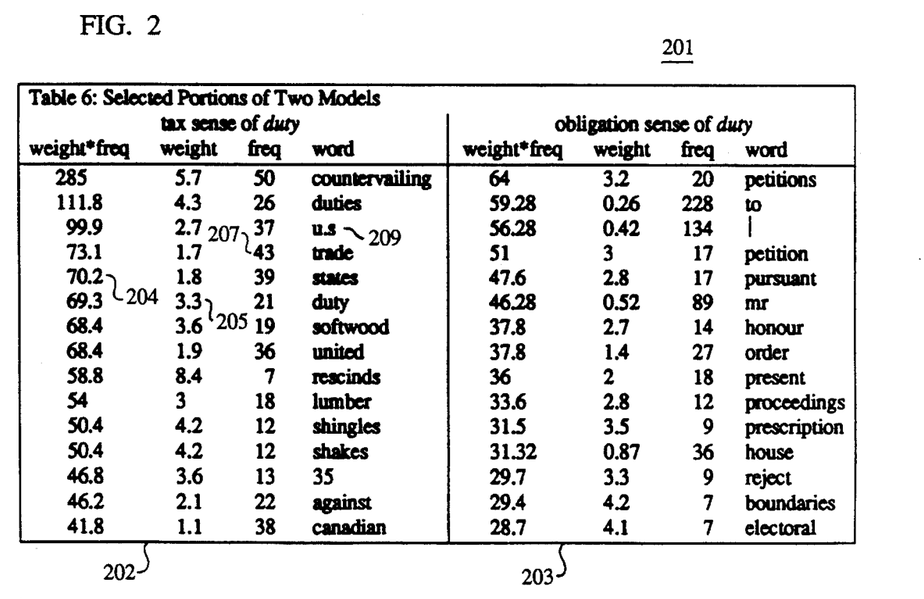
FIG. 2 is a table of data from which table 107 of FIG. 1 may be constructed.

Once the conditional sample is made, it is analyzed using Bayesian techniques which will be described in detail below to determine the weight of each word in the conditional sample with regard to the probability that the given ambiguous word has the sense used to make the conditional sample. The result of the analysis is a subtable 108 in word/sense pair probability table 107 for the given ambiguous word and the desired sense. FIG. 2 shows an example of the data which results from the analysis. Table 201 contains the data for two senses of the English word duty. The two senses are the tax sense and the obligation sense. Table 202 shows some of the data for the tax sense and table 203 shows some of the data for the obligation sense. Each table has four columns.

Word column 209 contains an entry for each word found in the conditional sample;

Frequency column 207 is the number of times the word occurs in the conditional sample;

Weight column 205 is the weight assigned to the word for the purposes of determining the desired sense; and Weight * frequency column 204 is the product for each word of the weight and the frequency.

The values in column 204 are used to decide which words should be included in subtable 108 for the word/sense pair. Those having the highest product are most indicative. The size of the subtable 108 may be reduced by using a default weight for all words whose products in column 204 are less than a predetermined value. Subtable 108 is constructed from table 202 by making an entry for each word which has not been given the default weight. The entry contains the weight computed for that word.

As is apparent from the foregoing, the creation of word sense pair probability table 107 from the Canadian Hansards can be completely automated. The Canadian Hansards exist in machine-readable form, there are machine techniques available for locating the French equivalent of a given occurrence of an English word in the Canadian Hansards, and the extraction of the conditional sample and the computation of the weight may also be done completely by computer.

Computation of the Weight

In a preferred embodiment, the weight, wt, of a given vocabulary word in determining the sense of a given word/sense pair is defined by the equation:

$$wt = \log \frac{E(\pi|a)}{p(\text{word in corpus})}$$

where $\pi$ is the conditional probability of the given vocabulary word, a is the frequency of the given vocabulary word in the conditional sample, and E is the expectation of $\pi$ given a.

An advantage of computing the weight as set forth above is that it interpolates between word probabilities computed within the 100-word contexts of the conditional sample and word probabilities computed over the entire corpus. For a word that appears fairly often within the 100-word context, we will tend to believe the local estimate and will not weight the global context very much in the interpolation. Conversely, for a word that does not appear very often in the local context, we will be much less confident in the local estimate and will tend to weight the global estimate somewhat more heavily. The key observation behind the method is this: the entire corpus provides a set of well measured probabilities which are of unknown relevance to the desired conditional probabilities, while the conditional set provides poor estimates of probabilities that are certainly relevant. Using probabilities from the entire corpus thus introduces bias, while using those from the conditional set introduce random errors. We seek to determine the relevance of the larger corpus to the conditional sample in order to make this trade off between bias and random error.

$$p(\pi,a) = \binom{n}{a} \{rB^{-1}(A + 1/2, N - A + 1/2)\pi^{A+a-1/2}(1-\pi)^{N-A+n-a-1/2} + (1-r)B^{-1}(1/2,1/2)\pi^{a-1/2}(1-\pi)^{n-a-1/2}\}$$

We then form $$p(a) = \int_0^1 p(\pi,a)d\pi$$

and $$p(\pi a) = p(\pi,a)/p(a)$$

which is then integrated to give $$E(\pi\ a) = \int_0^1 \pi p(\pi\ a)d\pi = \frac{r\frac{B(A+a+1\,1/2,N-A+n-a+1/2)}{B(A+1/2,N-A+1/2)} + (1-r)\frac{B(a+1\,1/2,n-a+1/2)}{B(1/2,1/2)}}{r\frac{B(A+a+1/2,N-A+n-a+1/2)}{B(A+1/2,N-A+1/2)} + (1-r)\frac{B(a+1/2,n-a+1/2)}{B(1/2,1/2)}}$$

$E(\pi|a)$ is computed in a preferred embodiment by dividing the entire body of text into a conditional sample of size n for the given word/sense pair and the residual corpus (the entire corpus less the conditional sample) of size $N \gg n$. Let a be the frequency of a given vocabulary word in the conditional sample, and A its frequency in the residual corpus. Either of these frequencies may be zero, but not both. Let $\pi$ represent the conditional probability of the vocabulary word. Before knowing the frequency of the word in either sample, we could express our ignorance of the value of $\pi$ by the uninformative distribution:

$$B^{-1}(1/2,1/2)\pi^{-1/2}(1-\pi)^{-1/2}$$

where B (x,y) is the Beta function. Several variations of the method can be based on variations in the uninformative distribution. If A additional observations out of N, relevant to the determination of $\pi$, were made the distribution expressing our knowledge would become $$B^{-1}(A+1/2,N-A+1/2)\pi^{A-1/2}(1-\pi)^{N-A-1/2}$$

While we have A out of N observations of the word in question in the residual corpus, we do not know their relevance. Thus we set as our knowledge before observing the conditional sample the distribution:

$$p(\pi) = rB^{-1}(A+1/2,N-A+1/2)\pi^{A-1/2}(1-\pi)^{N-A-1/2} + (1-r)B^{-1}(1/2,1/2)\pi^{-1/2}(1-\pi)^{-1/2}$$

where $0 \leq r \leq 1$ is the relevance of the residual corpus to the conditional sample. When r=0, this gives the uninformative distribution, while if r=1, it gives the distribution after observing the residual corpus. Another way of reading this is that with probability r we are expecting an observation in line with the residual corpus, but that with probability 1−r we won't be surprised by any value.

The joint probability of observing a out of n instances of the word in question in the conditional sample and that the conditional probability is $\pi$ is then This can be approximated in various ways, but it is practical to calculate it directly using the relationship $$B(x,y) = \frac{\Gamma(x)\Gamma(y)}{\Gamma(x+y)}$$

The parameter r, which denotes the relevance of the residual corpus to the conditional sample, can be estimated in various ways. Its basic interpretation is the fraction of words that have conditional probabilities close to their global probabilities (as estimated from the residual sample). Thus given a set of estimates of conditional probabilities, one can estimate r as the fraction of them which lie within a few standard deviations of the corresponding global probabilities. This estimate is performed using the words which are observed in the conditional sample. Alternatively r can be regarded as a free parameter of the method and adjusted to produce optimal results on a specific task. Although it could be varied for each word, we have used r=0.8 for all words in the sense disambiguation application, and r=0.98 for all words in the author identification application. Further, the fact that the weight calculated by the above technique is a logarithmic value means that the process of multiplying the probabilities that the occurrences of the vocabulary words in the sample indicate the given word/sense pair can be done as follows: for each occurrence of a vocabulary word in the context, look up the word's weight in subtable 108 for the given word/sense pair and add the weight to the sum of the weights of the preceding occurrences of vocabulary words.

Using Categories of Meaning to Determine Suitability of a Word/Sense Pair

The use of bilingual bodies of text as described above permits the automation of training, and consequently represents a significant advance. However, training on such bilingual bodies of text does have its drawbacks. First, it offers no help whatever with words that do not appear in the bilingual body of text. Such bilingual bodies of text are presently often bodies of legal or political text, and therefore have quite specialized vocabularies. Second, particularly with regard to languages like English and French, which have closely-related vocabularies, the translation of an ambiguous word may itself be ambiguous. An example here is the English word interest. Its French translation, intérêt, has substantially all of the senses of the English equivalent. The latter problem becomes less difficult with multilingual bodies of text. Disambiguation should be particularly easy if one of the languages in which the multilingual body of text exists is non-Indo-European.

These problems can be overcome by using the categories of meaning to which vocabulary words belong to determine the suitability of a word/sense pair for a context. Thesauruses and dictionaries often divide the words they give equivalents for or otherwise define into categories. For example, Chapman, Robert, *Roget's International Thesaurus(Fourth Edition)*, Harper and Row, New York, 1977, divides the words for which it gives equivalents into 1042 subject matter categories. These categories can be used to automatically train on any body of English text and the relationships between vocabulary words in the text and subject matter categories can be used in the testing phase to determine suitable word/sense pairs for a context as described above with regard to bilingual bodies of text.

The method of using categories of meaning is based on the following general observations: 1) Different classes of words, such as ANIMALS or MACHINES tend to appear in recognizably different contexts. 2) Different word senses tend to belong to different conceptual classes (crane can be an ANIMAL or a MACHINE). 3) If one can build a context discriminator for the conceptual classes, one has effectively built a context discriminator for the word senses that are members of those classes. Furthermore, the context indicators for a Roget category (e.g. gear, piston and engine for the category TOOLS/MACHINERY) will also tend to be context indicators for the members of that category (such as the machinery sense of crane).

We attempt to identify, weight and utilize these indicative words as follows. For each of the 1042 Roget Categories:

1. Collect contexts which are representative of the Roget category
2. Identify salient words in the collective context and weight the words appropriately, and
3. Use the resulting weights in the testing phase.

Step 1: Collect Context which is Representative of the Roget category

Figure 3:
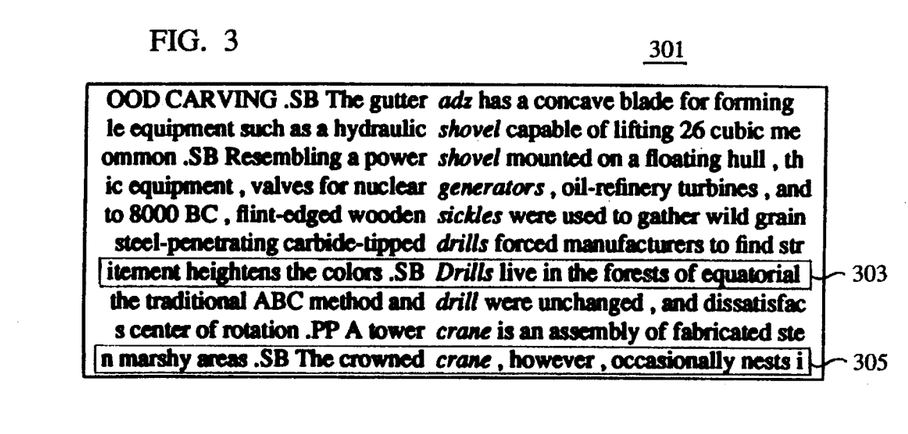
FIG. 3 is an example of part of a conditional sample.

The goal of this step is to collect a set of vocabulary words of the body of text upon which training is being done which are typically found in contexts which contain at least one of the words listed in a given Roget category. To do this, we make a conditional sample for the category. The conditional sample consists of the 100 surrounding words for each occurrence of each member of the given category in the corpus. FIG. 3 shows a sample set 301 of portions of the conditional sample for words in the category TOOLS/MACHINERY (348). The complete conditional sample contains 30,924 lines, selected from the particular body of text used for training in the preferred embodiment, the 10 million word, June 1991 electronic version of Grolier's Encyclopedia.

Ideally, the conditional sample would only include references to the given category. But in practice it will unavoidably include spurious examples since many of the words are polysemous (such as drill at 303 and crane at 305 of FIG. 3). Polysemy is dealt with in the preferred embodiment by weighting the vocabulary words in the conditional sample to minimize the effect. The weighting also serves to make the sample representative of all tools and machinery, not just the more common ones. The weighting is done as follows: If a word listed in a Roget's category such as drill occurs k times in the corpus, all vocabulary words in the context of drill contribute weight 1/k to the frequency values for those vocabulary words in the conditional sample.

While the level of noise introduced through polysemy is substantial, it is tolerable because those senses of the words in the given Roget's category which do not belong to the category are distributed through the 1041 other categories, and consequently, there is no strong association between vocabulary words associated with the senses of the words which do not belong to the category and any one category, whereas all of the vocabulary words which are associated with the senses of the words which do belong to the category are associated with that category. Only if several words listed in the given Roget's category had secondary senses in a single different Roget's category would context typical for the other category appear significant in this context.

Despite its flaws, the conditional sample serves as a representative, albeit noisy, sample of the typical context of TOOLS/MACHINERY in Grolier's encyclopedia.

Step 2: Identify salient words in the conditional sample, and weight appropriately Intuitively, a salient word is one which appears significantly more often in the conditional sample than at other points in the body of text, and hence is a better than average indicator for the category. We formalize this with a mutual-information like estimate: $Pr(w|RCat)/Pr(w)$, the probability of a vocabulary word w appearing in the conditional sample for a Roget's category divided by the overall probability of the vocabulary word appearing in the body of text.

Figure 4:
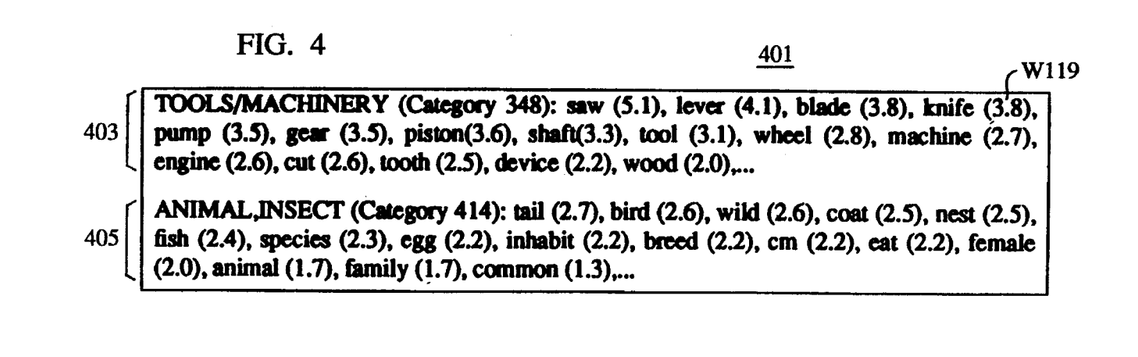
FIG. 4 is an example of weights computed using Roget's categories.

$Pr(w|RCat)$ can be computed using the same techniques as were used to compute the weight of the vocabulary words in the case of the bilingual body of text. The only substantial difference is the use of 1/k as described above to compute the frequency of a vocabulary word in the conditional sample. FIG. 4 shows the most important salient words for Roget categories 348 and 414, TOOLS/MACHINERY and ANIMAL,INSECT respectively. The numbers in parentheses are the log of the salience, that is, the weight 119, for each of the vocabulary words for the given category. The vocabulary words which appear in categories 403 and 405 are those which are most important for determining whether a word/sense pair belongs to a given context. As before, importance is determined by multiplying the vocabulary word's weight by its frequency in the conditional sample.

It is worth noting that the salient vocabulary words for a Roget's category includes many words which are not listed in the category. What the salient vocabulary words are is vocabulary words which are likely to co-occur with words which are listed in the given category. The list of salient vocabulary words for a category typically contains over 3000 words, and is far richer than any list which can be derived from a dictionary definition.

Step 3: Use the resulting weights in the testing phase

In the testing phase, the Roget's category indicated by the vocabulary words which surround a position in a text can be used to determine whether a word/sense pair is proper for the position. If the sense of the word/sense pair belongs to the same Roget's category as that indicated by one of the salient vocabulary words, then there is evidence that the word/sense pair is proper for the position. If several salient vocabulary words appear, the evidence is compounded. As shown below, the testing phase works as described with regard to FIG. 1: having built word/sense pair probability tables 107 for all of the word/sense pairs we are interested in using the techniques just described to determine the weights of vocabulary words for indicating the various word/sense pairs, the probability of a given word/sense pair for a position in a 100-word context surrounding the position is determined by adding the weights of all of the words in the context. When the apparatus is being used to disambiguate, the word/sense pairs used are those for the word and its various senses. The word/sense pair with the largest total of weights is the pair which is best suited for the context.

For example, the word crane appears 74 times in Groliers; 36 occurrences refer to the animal sense and *38* refer to the heavy machinery sense. The system correctly classified all but one of the machinery senses, yielding 99% overall accuracy. The one misclassified case had a low score for all models, indicating a lack of confidence in any classification.

In a preferred embodiment, the senses of a word are defined to be the Roget's categories to which the word belongs. Although it is often useful to restrict the search in this way, the restriction does sometimes lead to trouble, especially when there are gaps in the thesaurus. For example, the category AMUSEMENT (#876) lists a number of card playing terms, but for some reason, the word suit is not included in this list. As it happens, the Grolier's Encyclopedia contains 54 instances of the card-playing sense of suit, all of which are mislabeled if the search is limited to just those categories of suit that are listed in Roget's. However, if we open up the search to consider all 1042 categories, then we find that all 54 instances of the card-playing sense of suit are correctly labeled as AMUSEMENT, and moreover, the score is large in all 54 instances, indicating great confidence in the assignment. It is possible that the unrestricted search mode might be a good way to attempt to fill in omissions in the thesaurus. In any case, when suit is added to the AMUSEMENT category, overall accuracy improves from 68% to 92%.

Conclusion

The foregoing Detailed Description has disclosed to those of ordinary skill in the text analysis arts how a context larger than a single line may be advantageously used to determine whether a word/sense pair is proper for a location in the context. It has also disclosed how Bayesian techniques may be used to give the vocabulary words of a context weights with regard to a given word/sense pair and how these weights may be used to determine whether the word/sense pair is proper for the location. It has further disclosed how the properties of ambiguous words in discourses can be used in disambiguating the words. The Detailed Description has moreover shown the importance of large contexts and Bayesian techniques for training apparatus for determining whether a word/sense pair is proper for a location and has shown how training may be automated using bilingual bodies of texts or categories of word meanings.

As set forth in the Detailed Description, the above techniques may be used separately or may be combined to particular advantage. Moreover, one training technique may remedy the shortcomings of another. For example, as previously pointed out, the French Hansards cannot be used to train for the various senses of the word interest; however, the method of training on bilingual texts could be supplemented in this case by the use of the Roget's categories.

Many variations on the techniques disclosed herein will be apparent to those of ordinary skill in the text analysis arts. For example, only two methods have been disclosed herein for producing conditional samples, but the techniques of Bayesian analysis described herein may be applied to conditional samples produced in any fashion whatever. Similarly, while the contexts disclosed herein have a length of 100 words, contexts of any length substantially longer than a single line will have some of the advantages of those of 100 words. Finally, many techniques other than those disclosed herein can be employed which take advantage of the fact that a given discourse tends to use an ambiguous word in only one sense. Additionally, those skilled in the art will know many ways of implementing word/sense pair probability table 107 and of implementing sense likelihood calculator 103. That being the case, foregoing Detailed Description is to be regarded as being in all respects illustrative and exemplary, and not restrictive, and the scope of the inventions disclosed herein is to be determined solely by the following claims as interpreted in light of the Specification and according to the doctrine of equivalents.

What is claimed is:

1. A method performed in a computer system of determining whether a sense for a word is lexically appropriate to a given position in a text accessible to the computer system, the method comprising the steps of:

using the computer system to obtain a sequence of words in the text which includes the given position and is predominantly substantially longer than the average length of the sentences of the text and to store the sequence; and using the computer system to make a word sense determination of whether a sense specified in a word/sense pair for the word which is stored in the computer system is a sense which is lexically appropriate to the given position by automatically analyzing the sequence.

2. A method used in a computer system of determining a probability that a sense for a word is lexically appropriate to a given position in a text accessible to the computer system, the method comprising the steps of:

using the computer system to obtain a sequence of words in the text which includes the given position and to store the sequence; and using the computer system to make a probability determination of the probability that the sense specified in a word/sense pair for the word is a sense which is lexically appropriate to the given position, the word-sense pair being stored in the computer system and the probability determination being made by employing a Bayesian discrimination technique involving the words in the sequence and a sense specified in the word/sense pair.

3. The method set forth in claim 1 wherein:

the step of using the computer system to obtain a sequence of words obtains a sequence whose length is approximately 100 words.

4. The method set forth in claim 1 further including the steps performed in the computer system of of:

determining whether the word sense determination indicates beyond a predetermined threshold whether the sense specified in the word sense pair is lexically appropriate to the given position; and if the word sense determination does not so indicate, making a final determination of the sense of the word in the word/sense pair by comparing the result of the word sense determination with the result of another word sense determination of a sense of the word which is lexically appropriate at another position in the text.

5. The method set forth in claim 1 wherein:

in the step of using the computer system to make a word sense determination, the sequence is automatically analyzed by employing a Bayesian discrimination technique involving the words in the sequence and the sense of the word-sense pair to determine the probability that the sense of the word/sense pair is lexically appropriate for the given position.

6. The method set forth in claim 1 wherein:

there is a plurality of the word/sense pairs;

the step of using the computer system to make a word sense determination is performed for each of the word/sense pairs; and the method further includes the step of selecting the word/sense pair whose sense is lexically most appropriate for the given position.

7. The method set forth in claim 6 wherein:

the step of selecting the word/sense pair includes the step of comparing the result of the word sense determination with the result of another word sense determination at another position in the text.

8. The method set forth in claim 1 wherein the step of using the computer system to make the word sense determination includes the steps of:

for words in the sequence, obtaining weights from a table stored in the computer system which indicates the weight of certain words for determining whether the sense specified in the word/sense pair is lexically appropriate to the given position and summing the weights to determine a likelihood that the sense specified in the word/sense pair is lexically appropriate to the given position.

9. The method set forth in claim 8 wherein:

there is a plurality of the word/sense pairs;

the steps of obtaining the weights and summing the weights are performed for each word/sense pair; and the method includes the further step of selecting the word/sense pair having the summed weights which indicate the greatest likelihood that the sense of the word/sense pair is lexically appropriate to the given position.

10. The method set forth in claim 9 wherein the step of selecting the word/sense pair includes the step of:

comparing the sense of the selected word/sense pair with the result of another word sense determination of a sense for the word in the word/sense pair which is lexically most appropriate at another position.

11. The method of any one of claims 1 or 3 through 10 wherein there is an occurrence of the word specified in the word/sense pair at the given position.

12. The method set forth in claim 2 wherein:

there is a plurality of the word/sense pairs;

the step of using the computer system to make a probability determination is performed for each of the word/sense pairs; and the method includes the additional step performed in the computer system of selecting the word/sense pair whose sense is lexically most appropriate to the given position.

13. The method set forth in claim 12 wherein the step of selecting the word/sense pair includes the step of:

comparing the sense of the selected word/sense pair with the sense of the word/sense pair resulting from another probability determination of the lexically most appropriate sense at another position in the text.

14. The method set forth in claim 2 wherein the step of using the computer system to make a probability determination includes the steps of:

for words in the sequence, obtaining weights from a table stored in the computer system which indicates the weights of certain words for determining whether the word/sense pair has a sense which is lexically appropriate, the weights being computed using the Bayesian discrimination technique, and summing the weights to determine a likelihood that the word/sense pair is lexically appropriate to the given position in the text.

15. The method set forth in claim 14 wherein:

there is plurality of the word/sense pairs;

the steps of obtaining the weights and summing the weights are performed for each word/sense pair; and the method includes the further step performed in the computer system of selecting the word/sense pair having the summed weights which indicate the greatest likelihood that the word/sense pair is lexically appropriate for the given position in the text.

16. The method set forth in claim 15 wherein the step of selecting the word/sense pair includes the step of:

comparing the sense of the selected word/sense pair with the sense of the word/sense pair resulting from another probability determination of the lexically most appropriate sense at another position in the text.

17. The method set forth in claim 2 further including the steps performed in the computer system of:

determining whether the step of using the computer system to make a probability determination produces a probability which is above a predetermined threshold that the word/sense pair is lexically appropriate to the given position in the text; and if the indication does not exceed the threshold, making a final determination of the suitable sense by comparing the sense of the word/sense pair with the sense of the word/sense pair resulting from another probability determination of the lexically appropriate sense at another position in the text.

18. The method of any one of claims 2 or 12 through 17 wherein:

there is an occurence of the word specified in the word/sense pair at the given position.

19. A method of using a computer system to determine whether a sense for a word is lexically appropriate to a given position in a text accessible to the computer system, the method comprising the steps of:

using the computer system to make a first determination of whether a sense specified in a word/sense pair for the word which is stored in the computer system is a sense which is lexically appropriate to the given position in the text; and using the computer system to make a final determination that the sense in the word/sense pair is lexically appropriate to the given position by determining that the sense in the word sense pair is lexically appropriate to another position in the text.

20. The method set forth in claim 19 wherein the method further includes the step performed in the computer system of:

determining whether the first determination indicates beyond a predetermined threshold whether the sense specified in the word sense pair is lexically appropriate to the given position; and the step of making a final determination is performed when the indication produced by the first determination does not so indicate.

21. The method set forth in any one of claims 19 or 20 wherein:

there is an occurrence of the word specified in the word/sense pair at the given position.

22. Apparatus for determining whether a sense for a word is lexically appropriate to a given position in a text, the apparatus comprising:

means for obtaining a sequence of words in the text which includes the given position and is predominantly substantially longer than the average length of the sentences of the text; and means for analyzing the sequence to determine whether a sense specified in a word/sense pair for the word is a sense which is lexically appropriate to the given position.

23. The apparatus set forth in claim 22 wherein:

the means for obtaining a sequence obtains a sequence whose length is approximately 100 words.

24. The apparatus set forth in claim 22 wherein:

the means for analyzing the sequence employs a Bayesian discrimination technique involving the words in the sequence and the sense of the word-sense pair to determine a probability that the sense specified in the word/sense pair is a sense which is lexically appropriate to given position.

25. The apparatus set forth in claim 22 wherein:

the means for analyzing the sequence further includes a table which indicates the weights of certain words in the text for determining whether the sense specified in the word/sense pair is lexically appropriate to the given position and the means for analyzing the sequence analyzes the sequence by obtaining weights of words in the sequence from the table and summing the weights of those words to determine a likelihood that the sense specified in the word/sense pair is lexically appropriate to the given position.

26. The apparatus set forth in claim 25 wherein:

the weight, wt of each of the certain words is determined by the equation $$wt = \log \frac{E(\pi|a)}{p(\text{word in a corpus of text})}$$

where $\pi$ is the condition probability of the word, a is the frequency of the word in a conditional sample, and E is the expectation of $\pi$ given a.

27. The apparatus set forth in any one of claims 22 through 26 wherein:

there is an occurrence of the word specified in the word/sense pair at the given position.

28. A method of using a computer to make a probability table for use in apparatus for determining whether a sense for a word is lexically appropriate to a given position in a text, the method of making the table comprising the steps of:

using the computer system to make and store a conditional sample of a text corpus accessible to the computer system, the conditional sample including contexts from the text corpus which are semantically related to the sense specified in a given word/sense pair;

using the computer system to determine for each word which occurs in the conditional sample a weight of that word in the conditional sample with regard to the probability that the word of the given word/sense pair has the sense specified in the given word/sense pair, the determination of the weight being done using a Bayesian technique; and storing a table entry in the computer system which includes the weight of the word for each of the occurring words which has more than a given weight.

29. The method set forth in claim 28 wherein:

the step of making a conditional sample is done using contexts which are predominantly substantially longer than the average length of the sentences in the text corpus.

30. The method set forth in claim 29 wherein:

the step of making a conditional sample is done using contexts whose lengths are approximately 100 words.

31. The method set forth in claim 28 wherein:

in the step of determining the weight of each word, the weight, wt for each word which occurs in the conditional sample is determined by the equation $$wt = \log \frac{E(\pi|a)}{p(\text{word in the corpus of text})}$$

where $\pi$ is the conditional probability of the word, a is the frequency of the word in the conditional sample, and E is the expectation of $\pi$ given a.

32. The method set forth in claim 28 wherein:

there exists a translation into another language of the text corpus from which the conditional sample is made; and in the step of making a conditional sample, a determination that the word of the given word/sense pair is used in the sense specified in the word/sense pair is made with reference to the corresponding word in the translation.

33. The method set forth in claim 28 wherein:

there exists a list of categorized words which belong to the same semantic category as the given word/sense pair; and in the step of making a conditional sample, the contexts contain words from the list.

34. The method set forth in claim 33 wherein:

in the step of determining the weight of each word, the weight, wt for each word which occurs in the conditional sample is determined by the equation $$wt = \log \frac{E(\pi|a)}{p(\text{word in the corpus of text})}$$

where $\pi$ is the conditional probability of the word, a is a value for the frequency of the word in the conditional sample, and E is the expectation of $\pi$ given a.

35. The method set forth in claim 34 wherein:

in the step of determining the weight of each word, a is derived by determining for each word from the list which is contained in a context the number of times k the word from the list appears in the corpus and letting all words in the context of such a word contribute a weight of 1/k to a.

36. A probability table for use in apparatus for determining whether a sense for a word is lexically appropriate to a given position in a text, the probability table being made by a method comprising the steps of:

making a conditional sample of the text corpus which includes contexts which are semantically related to a sense specified in a given word/sense pair;

employing a Bayesian technique to determine for each word which occurs in the conditional sample a weight of that word in the conditional sample with regard to the probability that the word of the given word/sense pair has the sense specified in the given word/sense pair; and making a table entry including the weight of the word for each of the occurring words which has more than a given weight.

37. The probability table set forth in claim 36, wherein:
in the step of employing the Bayesian technique, the weight, wt for each word which occurs in the condition sample is determined by the equation $$wt = \log \frac{E(\pi|a)}{p(\text{word in the corpus of text})}$$

where $\pi$ is the conditional probability of the word, a is the frequency of the word in the conditional sample, and E is the expectation of $\pi$ given a.

* * * * *